United States Patent [19]
Grisell

[11] Patent Number: 5,406,074
[45] Date of Patent: Apr. 11, 1995

[54] NONINVASIVE, REMOTE EYE POSITION AND ORIENTATION MEASUREMENT SYSTEM USING LIGHT BEAMS NORMAL TO THE SURFACE OF THE EYE

[76] Inventor: Ronald D. Grisell, HC01. Box, Spring Branch, Tex. 78070-9002

[21] Appl. No.: 192,542

[22] Filed: Feb. 7, 1994

[51] Int. Cl.$^6$ .................. G01V 9/04; G06M 7/00; H01J 40/14
[52] U.S. Cl. .................. 250/221; 250/561; 351/210
[58] Field of Search .................. 250/221, 561; 345/7, 345/8; 351/210, 211; 348/115

[56] References Cited

U.S. PATENT DOCUMENTS

| | | | |
|---|---|---|---|
| 4,720,189 | 1/1988 | Heynen et al. | 351/210 |
| 4,973,149 | 11/1990 | Hutchinson | 351/210 |
| 5,016,282 | 5/1991 | Tomono et al. | 382/2 |
| 5,231,674 | 7/1993 | Cleveland et al. | 382/6 |
| 5,331,149 | 7/1994 | Spitzer et al. | 250/221 |
| 5,341,181 | 8/1994 | Godard | 351/210 |

Primary Examiner—David C. Nelms
Assistant Examiner—Steven L. Nichols

[57] ABSTRACT

Photodetectors (18, 19) and light beam sources (10) are arranged near the field-of-regard (30) such that beams (12) are reflected from the viewer's eyes back to the photodetectors. For each beam, the beam direction and a line between its source and a photodetector where its reflected signal is maximized determine a plane which is perpendicular to the occular surface at the point of reflection. Three such non-parallel planes on the orbit intersect at a point near center of a sphere (14) approximating the orbit surface. Three non-parallel planes perpendicular to the cornea intersect near the center (34) of a sphere (16) approximating the corneal surface. A processor (26) operating on detector outputs determines coordinates of the optical axis (36) as the unique line passing through the center (32) and the center (34), as well as coordinates of these centers from which eye position can then be derived. From one or both optical axes, the line-of-sight can be determined. Line-of-sight parameters can be used, for example, to select options on a computer or television screen by staring at them and blinking or otherwise indicating the selection.

15 Claims, 2 Drawing Sheets

NONINVASIVE, REMOTE EYE POSITION AND ORIENTATION MEASUREMENT SYSTEM USING LIGHT BEAMS NORMAL TO THE SURFACE OF THE EYE

BACKGROUND—FIELD OF INVENTION

The invention provides a means to remotely and noninvasively measure position of one or both eyes of an individual, as well as orientation of the optical axes of these eyes, and optionally, from optical axis, the line-of-sight.

BRIEF SUMMARY

Optical axis and line-of-sight measurements are useful for example in ocular studies of people and animals, clinical examinations, and in hands-free remote control of systems. The line-of-sight (LOS) is offset somewhat from the optical axis, and is the direction in which one sees details most clearly. Estimates of eye position and orientation obtained without inconveniencing a person in any way would be quite useful in hands-free control of computers and television sets for example, where the person merely looks at a symbol for action on the screen and indicates that this action be taken by some body movement such as blinking once or twice. Typically, it is difficult for people to type fast and accurately. Although some improvement, even computer mice are somewhat inconvenient to move around a terminal screen and to point accurately at small icons. In contrast, the eye is far more adept at rapidly locating and focusing on a small point.

Eye position, orientation, and openness can computed by means of light beams directed so that the beams reflect back onto an arrangement of photodetectors, providing angular estimates of planes perpendicular to the eye at the points where each beam reflects (referred to as normals to the eye surface). The principle of this method is novel: the optical axis of an eye (or axis of symmetry of the orbit and lens) is approximated by the unique line which intersects the center of a sphere approximating the orbit surface (the whitish surface surrounding the cornea visible between the eyelids) and the center of a sphere approximating the corneal surface (the transparent cover of the lens). The LOS is then obtained by a known angle of approximately 4.5 degrees from the optical axis of one or both eyes (the fovea is slightly off the optical axis by this amount). More accurate estimates can be obtained with more than six normals.

BRIEF DESCRIPTION OF DRAWINGS

FIG. 1 shows schematically a single light transmitter (10) directing light beams (12) (dotted lines) at an orbit (14) and cornea (16) of an eye. These light beams are reflected from the eye surfaces (14, 16) to an arrangement of photodetectors (18). Beam direction control signals (20), optical axis (22) and LOS (not shown) are computed in a processor (26) from outputs of the detectors (28). Boundary (30) indicates the angular extent of the surface area or region of space being viewed. At least six planes (not shown) are defined by outgoing and reflected light beams, passing through arrays photodetectors (18, 19), eye surfaces (14,16) and transmitter (10). At least three of these planes intersect near the center of the orbit (32) and at least three other planes intersect at the center of the cornea (34). The optical axis (36) passes through the centers (32, 34) of these spheres, and this determines the LOS as well, which is offset from the optical axis by about 4.5 degrees (not shown).

FIG. 2 shows a specific source and photodetector geometry of FIG. 1 in more detail. The light transmitter (10) is to one side of the area (surface or volume, dashed) being viewed (36), and the photodetector array somewhat to the right of the area (36), and composed of two linear arrays (18) and (19) above and below the area (36). All devices (10, 18, 19) lie in a plane approximately perpendicular to the LOS of a viewer when looking straight ahead, and this plane may be in front of, level with, or behind area (36). Eyes of the viewer are at a distance from this plane twice the width of the viewed area (36).

FIG. 4 diagrams the circuits of the invention. A Processor (44) has two main functions: first, predicting optimal beam directions and outputting these to a Beam Direction Controller (46) and second, computing optical axis and LOS position and orientation parameters relative to the area being viewed. A Beam Former (48) takes input from (46) to form light beams (not shown) in controlled directions. The light source (not shown), Beam Former and Direction Controller can actually reside in the same unit when certain phased arrays are used. Dashed lines indicate an option where the Beam Former takes as second input (50) a modulation signal or beam shaping signal generated by Structuring Generator (52) to allow further discrimination between formed light beams. After reflection from an eye (not shown), each beam is received by one of the elements of the Photodetector Array (54), which outputs an analog signal to a Multichannel A-to-D Converter (56), which may optionally input to a Structure Decoder (58) if modulation or beam shaping is used. In any case, the output (60) of (56) is received by (44) for processing.

DETAILED DESCRIPTION

Surface measurement techniques already exist for control of machine tools or other applications where surfaces diffusely reflect and therefore permit well-known imaging methods with fixed light source and camera. However, if the surface is polished or transparent, as is the cornea and, to a lesser extent, the orbit near the cornea, illumination is reflected in very limited directions, and these directions may vary widely and rapidly due to small body and eye movements. As such a specular or reflecting surface moves, it is therefore necessary to move either the source or the detector or both. Currently no adequate methods have been developed to the knowledge of the inventor for tracking the specular reflections from the moving surface of the human eye with sufficient accuracy to remotely estimate eye orientation within a few degrees and at distances up to two or three meters.

My invention has an advantage in allowing stationary placement of sources and detectors by which reflections can be tracked electronically with no moving parts from a wide range of surface positions. Additionally, no imaging optics is required, further reducing system cost and size. Electrooptics forms and steers one or more light beams according to a beam directing algorithm so that a maximum intensity of the beam falls on one detector. For accuracy of a few degrees in eye orientation and in tracking the LOS on surfaces or in regions of dimensions on the order of a few meters, only one beam generating and steering device is required which is capable of generating several beams. These beams may be generated either simultaneously or in sequence, and they may be focused or broadened into "sheets" or otherwise shaped (any timing and shapings methods used will referred to as light "structuring"). The beam structuring of the invention can be implemented in many different ways. However, a simple embodiment will be described in which the beams are slightly focused so as to be circular in cross section and as narrow as possible throughout a specified region in which the viewer is free to move without affecting the accuracy of measurement. Another advantage of the invention is that the detectors can be inexpensive photodiodes or other low-cost photodetector devices. Since the beams can illuminate the highly reflective eye surfaces, the reflected light can be made intense at selected photodectectors by proper control of the beams. Therefore the ratio of the reflected signal to any background noise from diffuse reflectors near the eyes is adequate for accurate steering of each beam to maximize the signal at one chosen photodetector. Several low cost beam steering arrays have been developed, suitable for this application.

Disadvantages of Current Devices Overcome by the Present Invention

Must be mounted on glasses or in fixed position close to eye. (3473868, 4720189, 5093567, 4702575, 4453808)

Devices using CCD's are resolution-limited to a few feet, or CCD must be steered mechanically and require telephoto lenses. (4720189, 4729652).

Some devices require beam-splitters, dichroic mirrors and other expensive optical components (4702575, 4453808).

Devices using servos, chopper wheels, and other mechanical components are heavy, expensive, and not suitable for small, portable applications. Moreover, this must be placed close to the eye. Such devices are not accurate unless frequently recalibrated. (3864030, 4453808, 5036347).

Retinal reflections cannot be used safely at distances of more than a foot in daylight conditions since a dangerously high light intensity is necessary (4702575, 5002384).

Devices using linear or differential measurements as approximations to corneal rotation require careful calibrations for each person, and have significant error as eye orientation deviates from a central axis (4453808, 54702575, 3473868).

Objectives of the invention are met which overcome these limitations as follows:

Remote operation up to several meters from the eye.
Freedom from need calibrate.
Freedom from inhibition of movements of the individual.
Light weight, low cost, small size, large range and angular field of operation.
Low complexity of processing or computing power
Ease of installation in such systems as computers, television sets, process control stations and quality inspection stations.

Estimation of eye coordinates, optical axis, and LOS is based on computation of surface position and orientation from at least six planes perpendicular or "normal" to eye surfaces, at least three planes normal to the orbit, and at least three planes normal to the cornea. According to the basic law of reflection, the plane containing an outgoing and reflected beam is normal to the eye surface at the reflection point. Being normal, the plane therefore passes through the center of a sphere approximating the surface at the reflection point. Three planes which are non-coplanar intersect at a unique point near the centers of the three respective approximating spheres where the planes are normal. Thereby estimating the approximate centers of the orbit and cornea, the unique line which passes through these centers approximates the optical axis which is the axis about which the combined surface of orbit and cornea are rotationally symmetric. Given deviations from sphericity of the physiological surfaces, it is desirable to use more than three planes to estimate centers more accurately. With proper geometry of light sources and photodetectors, the intersections of triples of normal planes cluster around the axis of symmetry, as is true for any surface of revolution. Thus it is not important that the orbit and cornea surfaces be closely approximated by spheres, but we introduce these spheres to help the intuition.

As options to reduce the chances of confusing signals, ray paths from different sources can distinguished by various means such as time-sequencing of beams (only one beam used at a time), or different modulation signals, or by spatial characteristics such as beam profile, or by light frequency or a combination of these. For example, a method used in some laser rangers can be used where thin "sheets" of light are swept across the area to be measured, the timing of a photodetector signal determining angle of the outgoing beam when the photodetector is illuminated. The particular space or time structuring method used to distinguishing beams is not essential to the invention.

Figure 1:
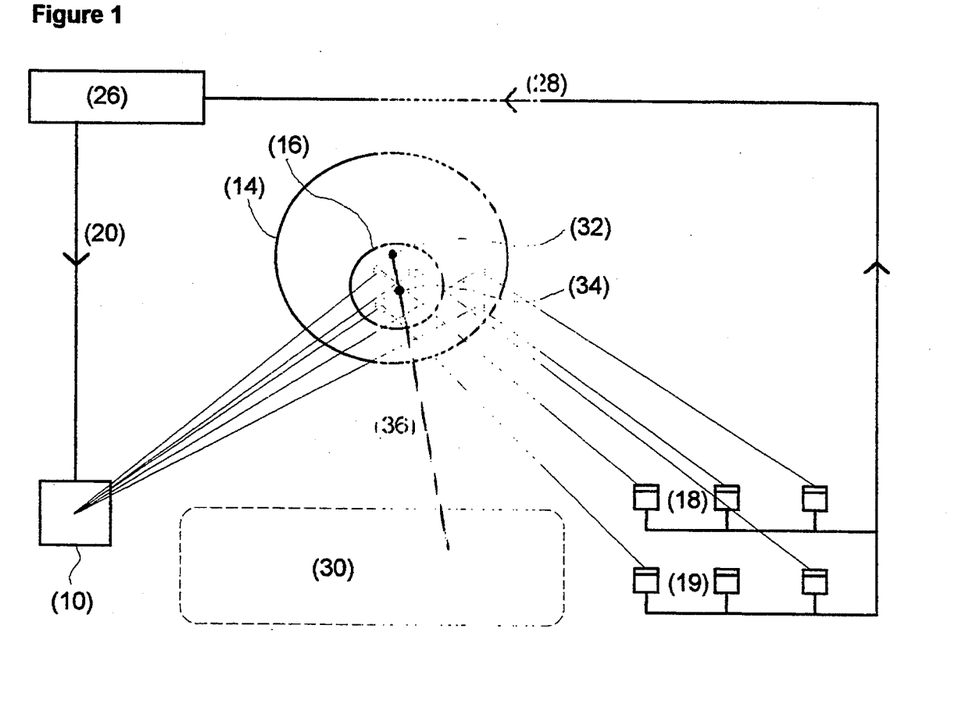
Figure 2:
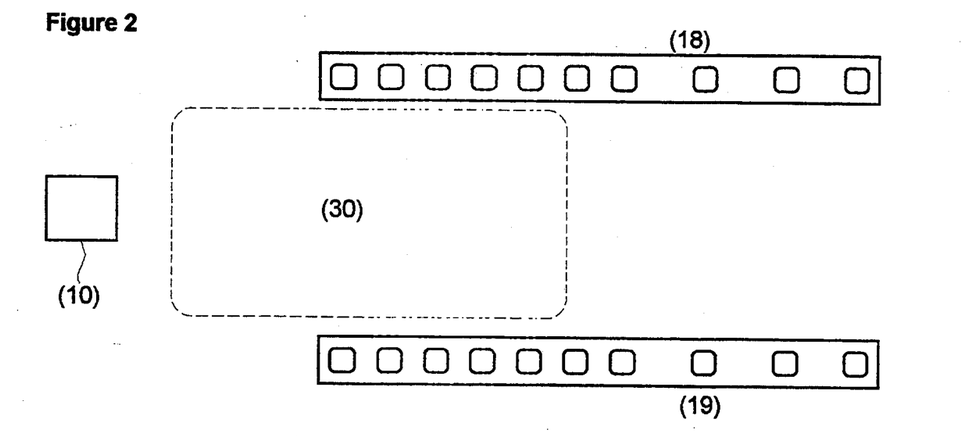

The invention will be described in detail, as illustrated overall in FIG. 1 (not in scale). The spheres approximate the surfaces of the orbit (14) and cornea (16) visible between the eyelids. Unfortunately the cornea is not spherical, but it is known to be closely approximated by a toroidal surface which is somewhat flatter in the horizontal direction across the cornea than in the vertical direction. Parameters of the corneal surface vary between people and even with an individual at different ages. The orbit is also not quite spherical and similarly varies. To complicate things further, there is an annular surface of transition between the orbit and cornea. To avoid extensive and frequent fitting calculations and calibrations for the complex eye surface of each person, the invention takes advantage of the fact that for a few degrees (ten to twenty) vertically to either side of the optical axis, the surface comprising cornea, orbit, and transition between them, is very nearly approximated by a surface of revolution about the optical axis (through the center of the orbit and the center of the lens). It is a well-known theorem in geometry that all lines normal (or perpendicular) to this approximating surface of revolution all pass through its axis of revolution. This axis approximates the optical axis closely enough that the latter can be estimated with an angular accuracy of well under half a degree from intersections of six planes properly placed relative to the physiological surface.

In order that normal planes can be used to accurately determine the axis of symmetry of a surface of revolution, it is important that at least two sets of three normal planes exist so that the two intersection points of these sets intersect near points on this axis which are spaced some distance apart. Since the eye is approximated by one sphere (the cornea) embedded in a larger sphere (the orbit) as shown in FIG. 1, normals will be so placed so that three are normal to the orbit (14), like the three planes containing the three light beams (12), and another triple of planes (not indicated) normal to the cornea (16). The intersection points (32, 34) of these two triples of planes are closest to the optical axis at about 3.7 millimeters apart in human eyes, the average distance between centers of spheres approximating orbit and cornea.

The preceding explanation in term of spherical approximations to the orbit and cornea and their centers helps to understand how approximations can be obtained with six normal planes (containing lines perpendicular to the surface). However, lines perpendicular to a corneal or orbit surface rarely intersect exactly due to physiological imperfections, so for accurate measurements it is necessary to solve equations for the "closest line of approach" to intersection points of more than two triples of planes; that is the line minimizing its maximum distance from all the normals using some metric such as minimum mean-squared distances. Such a closest line of approach is a good approximation to the optical axis in a precise statistical or mathematical sense.

Accuracy can generally be improved with more than six normals. Due to the small deviations from axial symmetry of the cornea and orbit, as well as greater roughness of the annular transition surface between orbit and cornea, more reflections help reduce error in optical axis and LOS estimation. Also, it happens that the orbit, as well as the transition annulus, is rougher than the cornea due to a conjunctival membrane which loosely rests upon it. Thus if some reflection points fall on this annulus more measurements of normals would improve the accuracy of LOS determination. Means can be provided to avoid the annular transition zone, as in the preferred algorithm to be described. However, this complicates the beam acquisition and tracking, and requires somewhat more processing speed.

If more than six normals are available, the preferred estimate of the optical axis is obtained as the solution an overdetermined set of equations by the well-known method involving the pseudoinverse of the matrix representing the coefficients of the equations. The latter solution is then the best estimate of the optical axis in the minimum mean-squares sense.

It happens that the actual LOS (through the fovea, which is offset somewhat from the optical axis) can be calculated by correcting the optical axis by 4.5 degrees. This correction varies among individuals as do other ocular parameters, but not more than half a degree except in exceptional cases (ocular pathologies, under pressure, etc.). Hence for applications not requiring more accuracy in line of sight angles than one degree, no calibration for individuals is required.

A Method Using Normal Lines

We have analyzed and simulated another promising method in detail where four or less light beams can be used. It is a theorem that at least four normals to a surface of revolution in general position determine its axis of revolution or axis of rotational symmetry (proof outlined in the calculation below). Here "general position" has the common meaning that linear equations whose solution is the coordinates of the axis of symmetry have nonzero determinant. If more than four normals are available, then an estimate of the optical axis can be solved from an overdetermined set of equations by the well-known method involving the pseudoinverse of the matrix representing the coefficients of the equations. The latter solution is then the best estimate of the optical axis in the minimum mean-squares sense. A minimum of two such normals is necessary. A point of intersection of a single orbit normal with the optical axis (5) can be obtained by extending that normal from the surface of the orbit by the average radius of an orbit. This extension is the center of the sphere approximating the orbit, and thus lies near the optical axis. Similarly a normal from the corneal surface can be extended by the average corneal radius, to approximate the center of the cornea. These radii do vary among individuals, so it is preferred that more than two normals are computed most of the time that an eye is being tracked.

Nevertheless, for the normal line method, more complicated photodetectors are required which can measure angles of incoming light so as to uniquely determine normal line to the eye surface at the point of reflection as the angular bisector of the outgoing and reflected beams. Indeed, light phasing arrays can be used with point detectors to estimate angle of incoming beams, in reverse as such arrays direct an outgoing beam, but we do not prefer this method due to the bulkiness and complexity of its apparatus.

In summary, eye position and orientation are accurately determined so long as the condition is satisfied that signals from two or more reflections are distinguished such that at least one is known to be reflected from the cornea and at least one from the orbit. For more accuracy, at least three reflections should be obtained from the orbit and at least three from the cornea to avoid inaccuracies due to variation of the orbit and cornea radii among individuals. It is also better that the head is not tilted more than a few degrees, so that the small offset from optical axis to the LOS is known within half a degree (horizontally and vertically). The head is very nearly level for a relaxed stance. Nevertheless, the error is not likely to be more than a few degrees in LOS angles even if the head is significantly tilted.

Specification of Viewer Position Constraints

Figure 3:
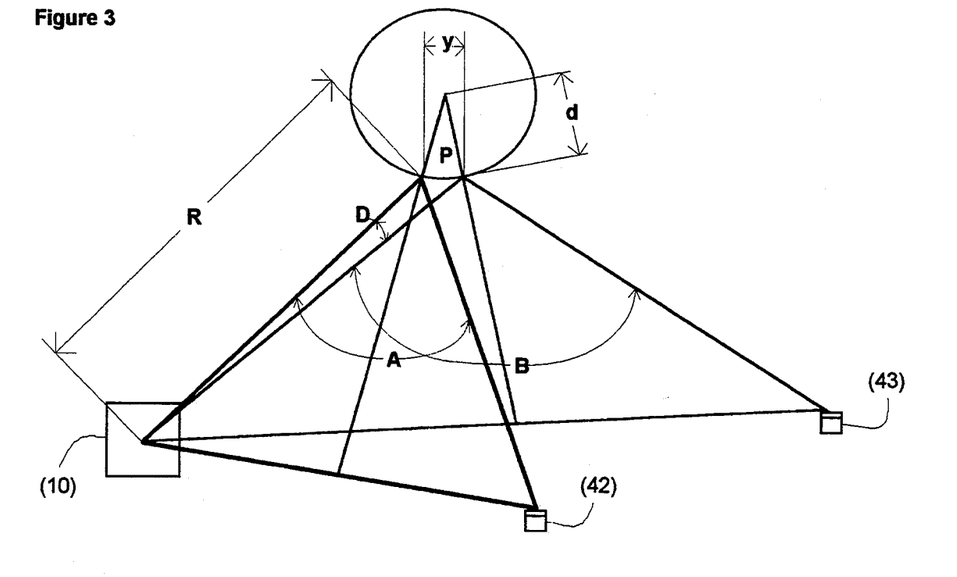
FIG. 3 shows angles and other measurements necessary to locate a surface of an eye (40) (either cornea or orbit) and compute its radius of curvature, d, from the positions of the transmitter (10) and two photodetector elements (42) and (43) within either of the arrays (18, 19) shown FIG. 1. The angles and dimensions are as used in formulas for range and surface curvature. Two of the planes indicated are illustrated as triangles, one with base from (10) to (42) (with heavy lines) and the other with base from (10) to (43) (with light lines).

For specified viewer positions and given viewed surface area or volume, there generally exists an arrangement of light sources and photodetectors which covers all positions and orientations of the eye when the LOS falls in the specified area or volume. For example, position and orientation variations are readily accommodated of five to ten feet and angle variations of up to thirty to forty five degrees or more from a rectangular viewing region, as illustrated in FIG. 3, of dimensions 3 feet by 5 feet. FIG. 3 indicates a region (2) being viewed straight on, with single light source (1) to the left side of the region and multiple detectors above (3) and below (4) the region. The viewer may be at a distance of one to five times the lateral dimension of the viewed area. The dimensions of this arrangement are convenient for placement near a computer screen on a desktop, or near a television set, for example.

Circuits of the Preferred Embodiment

Figure 4:
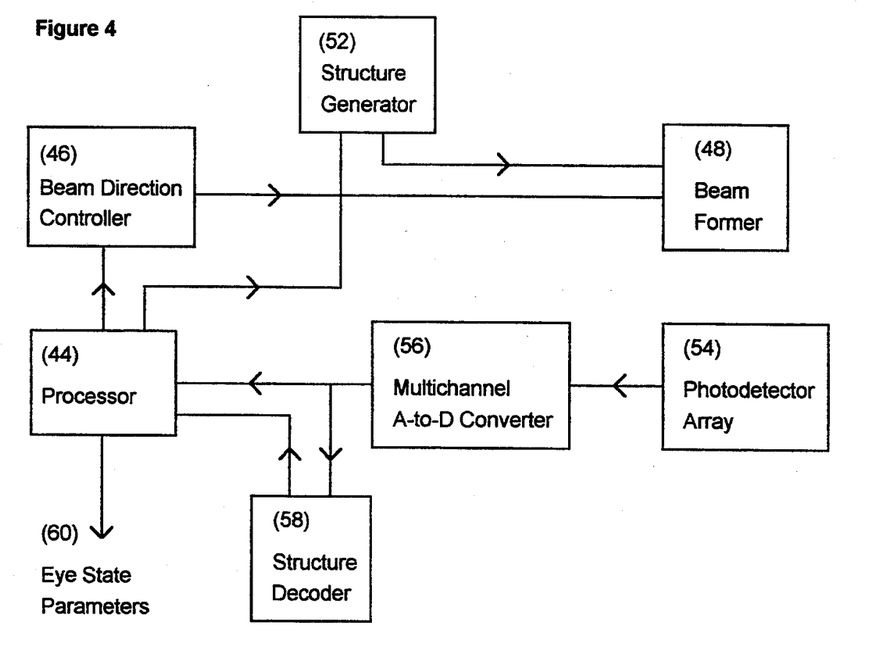

FIG. 4 diagrams circuitry for controlling six or more beams (not shown) by means of beam directing (46) and forming circuitry (48). Photodetectors and detection circuitry (54), analog-to-digital conversion (56), and a digital processor (44) are shown which complete the control loop. This feedback circuit controls each beam to maximize its detected illumination at one photodetector (a process typically called "tracking"), computes initial beam acquisition to be described. The processor (44) derives eye state parameters (60) as output, such as optical axis position and orientation, or LOS, as required. Optional beam encoding, modulating or spatial structuring circuits (52) and corresponding decoding circuits (58) to distinguish several beams, or possibly paths within a single beam, are indicated. In the latter, single-beam case, a beam broad enough to cover the entire eye could be modulated so that paths (subbeams) within the beam are located by their encoding. For example, two choppers with thin blades can sweep across the broad single beam, one blade horizontally and one vertically, so that the phases of the respective interruption pulses in a photodetector signal can be used to determine horizontal and vertical position respectively of a ray within the beam. In a one embodiment we have experimented with, thin sheets of light originating from pivoting light sources are swept horizontally and vertically across the eye. The reflection point for each photodetector is then determined by phase (or timing relative to start of sweep) of the horizontal and vertical signals. To increase accuracy, the swept area is continually adjusted so that the outermost photodetectors are reached by the extremes of the sweeps. The swept area is somewhat greater than the area of the eye, and the angles within this area can be computed with maximum accuracy from the phasings of the photodetector outputs due to the horizontal and vertical sweeps. Some Specific algorithms will be exhibited in the next section. Numerous similar chopping and sweeping methods are used in prior art for surface measurements; however, the invention does not depend on a particular method of light structuring.

Formula for Optical Axis

In all of the formulas below, capital letters will be used for vectors. Subscripts will indicate which beam the vector refers to. Components of vectors will be written as subscripted lower case letters, for example representing the vector $X = <x_1, x_2, X_3>$.

The optical axis is approximated by the solution for the line passing through two points, each point given by the intersection of three planes. However, in practice as is well known, it is preferable to avoid taking small differences between large measured quantities such as these absolute vector coordinates, but instead to measure the small relative angles between planes based at a single beam origin and differing only slightly relative to one of the beams lying on a particular plane. One vector, say X, along the center of the beam defining one of the planes will have absolute coordinates estimated via calculation of range and measurement of beam angle. For simplicity of expression, the origin of X will also be taken as the origin of coordinates for all positions and vector components. This X will also supply the desired eye position parameters. (A formula for range along this reference beam will be given in the next section.) All other beam vectors will be represented relative to X as unit vectors $Y_u, Z_u, W_u$, in the directions of maximum beam intensity. Given that the center point estimate, C, lies in the plane, its dot-product with a perpendicular vector to the plane must be zero. Perpendiculars to the planes are obtained via the cross products of the beam directions with vectors from sources to detectors, thus:

$$[X_u \times (S_1 - D_1)] \cdot C = 0$$

$$[Y_u \times (S_2 - D_2)] \cdot C = 0$$

$$[Z_u \times (S_3 - D_3)] \cdot C = 0$$

where $S_1$ is the source of the beam with direction $X_u$, $D_1$ is the center of the photodetector surface where the reflected beam is maximized, $S_2$ and $D_2$ are the similar points with respect to $Y_u$, $S_3$ and $D_3$ are source and detection points with respect to $Z_u$, and C is the center estimate to be solved for.

Differences between unit vectors actually represent angles relative to the direction of X. Such difference angles are generally less than a few degrees, and can be measured much more accurately relative to the reference direction $X_u$ than via calculation as small differences between the much larger absolute angles—a well-known practice for increasing accuracy in measurements in general. Accordingly, the above three intersecting normal plane equations can be rewritten, as used in the preferred implementation $$[X_u \times (S_1 - D_1)] \cdot C = 0$$

$$[(X_u + (Y_u - X_u)) \times (S_2 - D_2)] \cdot C = 0$$

$$[(X_u + (Z_u - X_u)) \times (S_3 - D_3)] \cdot C = 0.$$

These equations employ the differences, $(Y_u - X_u)$ and $(Z_u - X_u)$, obtained directly from the small angle measurements of beams relative to X. Of course, more equations can be used if more beams are available, to obtain an over-determined solution. In this case, a best estimate for C can be obtained in the mean-squares sense by solution using the pseudoinverse of the matrix of equation coefficients, as is well known.

Eye location is then taken to be the average of the center vector of the orbit and the center of the cornea, each obtained as C, above. This is the midpoint between the two centers, and can be used as a "base" or reference point on the optical axis. The axis is thus completely determined by its base point and two orientation angles, e.g. vertical and horizontal direction angles.

Sensitivity of Estimates

Base point and angular directions of the optical axis can be estimated with relative accuracy (ratio of error to absolute value) comparable to that of the relative accuracies of estimates of reference vector X and the distances between beam source center points and points of their respective maximum reflected intensities at photodetectors. The latter will be called base distances. For example, $S_1 - D_1$, above is the base distance in determination of the plane of X. In general the precise formula for the sensitivity of the method requires differentiating the solution of the above equations, which is somewhat messy. However, upper bounds for relative errors can be derived fairly simply. We know that the perpendicular line to the surface at the reflection point lies on the plane determined by light source, photodetector with maximized signal, and reflection point (the normal plane). Since these lines intersect or have their closest point of approach near the center of the sphere approximating the surface, the normal planes which contain them must also intersect near this center. The relative angles of normal planes with respect to a reference vector, such as X, at the eye surface have error much smaller than range R divided by maximum base distance error due to the convexity of the eye surface. Using the small-angle approximation of the sine function, we can multiply this normal angular error in radians by the radius of the orbit (or about 11.5 millimeter) to get a bound on error of the normal intersection near the optical axis. Doing the same for the radius of the cornea (about 7.8 millimeter) gives the error of corneal normal intersections. With at least three normals on the cornea and two on the orbit separated by at least 20 degrees, as is convenient with the geometry of FIG. 3 for example, a bound on the error in approximating the center of a sphere is less than three times the latter error divided by the sine of 20 degrees. A bound on the maximum angular error in radians in the optical axis is the sum of these bounds on center errors (worst case) divided by the distance between the centers of the orbit and the cornea, which is about 3.7 millimeters (again using the small-angle approximation). This upper bound is on the order of 0.5 degree for the optical axis of a human eye, where the eye is at 1 meter from both light source and photodetectors, given an upper bound in error in measurement of direction of maximum beam intensity at the photodetectors of 1 millimeter. Such a precision is quite feasible for many low-cost photodetectors.

Formula for Surface Curvature

In general, the dispersion or root-mean-squared variation of angles of three or more beams determined by three or more adjacent photodetectors is proportional to the square of the radius of curvature of the reflecting surface. Thus depending on the square of the radius, dispersion provides a highly sensitive measurement of radius. The basic principle is illustrated by FIG. 3. Two triangles, one with heavy lines and the other light, are obtained at adjacent or nearby photodetectors (42) and (43) which lie approximately in the same plane. Let d be the distance to the closest point of approach between the two perpendicular lines at the reflections from the eye surface. This distance is an estimate of radius of curvature in the vicinity of the reflection points. In case the two triangles are nearly coplanar, then the normals nearly intersect, d can be more simply computed from side y, and angle $P=(B-A)/2$ using the sides-opposite-angles formula $$d = \sin(180° - P/2) y / \sin(P).$$

Since adjacent photodetectors are generally close together, y can be approximated closely as the distance perpendicular from the first normal (dashed line which is the bisector of the heavy triangle) to the second normal line (dashed)

$$y = R\sin(D)/\sin(90° - D - A).$$

This formula is more than accurate enough to distinguish between orbit radius and corneal radius, which are about 11.5 versus 7.8 millimeters respectively, even with relative error up to about 25 %.

The dependence of angular dispersion on the square of d comes about as follows: for small angles, $y \sim = Pd$. Also, $B - A - D = 2P$. Since $y \sim = RD$, we have $Pd \sim = RD$, hence $$B \sim = 2RD/d + A + D,$$

so the rate of change of B with respect to d is proportional to the reciprocal of the square of d.

Optional Implementation Features

Finally, two features of the preferred implementation will now be discussed: the beam formation and the acquisition and tracking algorithms. Suitable beam forming arrays are available of at least three types: nematic liquid crystal spatial light phase modulators [6], ferroelectric liquid crystal spatial light phase modulators [7], and deformable-mirror spatial light modulators [8, 9]. Sufficiently large arrays in each technology can be obtained capable of directing a beam at variable and controlled angles toward said eye surface with an angular accuracy of about a tenth of a milliradian, which is sufficient for determination of orientation of the optical axis well within a degree horizontally and vertically.

Secondly, it is often necessary is to obtain line of sight measurements in a highly dynamic situation where the person or the screen is moving or both. The problem is solved by the following straight-forward initial track acquisition and tracking methods (although the invention is not limited to these particular algorithms). We first present a simplified algorithm, and then a more complicated but more robust algorithm.

A Simple, Combined Beam Acquisition and Tracking Algorithm

One implementation of the beam acquisition and tracking uses a method similar to those used in laser ranging systems wherein each light beam is structured as sheet of light which is swept across the area where the eyes are assumed to be located. The time relative to start of sweep at which a photodetector signal is maximized is proportional to the angle of the sweep with respect to that photodetector. Two such sheet beams are sufficient to determine horizontal and vertical angles, for example when the beams are swept perpendicularly to each other in the horizontal and vertical directions. Disadvantages of this method are (1) there are moving parts, such as mirrors which direct the beams, and (2) there is less accuracy than with circularly-structured tracking beams as in the preferred implementation above, due to the necessity of sweeping the entire area where eyes may be located. However, it is possible to use a modification of the preferred tracking and acquisition algorithms to more slowly move the sweeping pattern of the sheet beams in a smaller area sufficient to detect the eyes, and to continue tracking if the head moves significantly.

This simpler, mechanical method further illustrates what we mean by "structuring" and "encoding" of light beams. In comparison with the next method to be described, where beam structuring is circular and no time-encoding is necessary, the latter method utilizes beams structured as flat sheets of light, as thin as possible. The encoding is the time or phase from start of sweep at which a given photodetector signal is maximum. Many other beam structuring and encoding methods are conceivable. The following algorithms have the advantage that a beam-forming array can be used, eliminating any moving parts from the system. Beam formation also allows the narrowest possible circular beam to be formed in which intensity falls off with a Gaussian function with peak at the beam center. This aids in determining the angle to reflected beam center accurately.

Preferred Beam Acquisition Algorithm

A newly formed circular beam, say Beam 1, is steered in a spiral pattern of increasing radius until its reflection is maximized at one (any) photodetector. Starting from the maximum point a similar spiral search is made up to a specified angular limit (usually less than a degree) until the signal at a second photodetector adjacent to the first is maximized. If a first or second signal cannot thus be obtained, the search is repeated up to some specified number of times (the eye may have been blinking) and an appropriate error is signaled indicating that first track or radius cannot be obtained.

Radius of curvature of the ocular surface where Beam 1 fell after the first spiral search is then estimated.

If Beam 1 acquires points on the orbit as determined from a sufficiently large estimated radius of curvature, then tracking is begun to keep this beam maximized on its photodetector.

A second beam, Beam 2, is then steered in a spiral pattern of decreasing radius about Beam 1, starting at the radius of an average human eye surface visible between the eyelids, until two adjacent photodetector signals are maximized. (Here, adjacent means closest neighbors in the photodetector array. ) Because the spiral starts at such a radius encompassing the cornea and decreases in radius, soon some of the reflections picked up by photodetectors will be from the cornea. The rest of the sweep, when it is large, falls on skin around the eyes, which reflects diffusely and results in a very weak signal if any.

Radius of curvature is computed with Beam 2 as with Beam 1.

If the curvature where Beam 2 falls is small, within range of a corneal radius, then tracking is begun for this beam, and a third beam, Beam3, is then steered in a decreasing spiral, starting with a diameter of 1 millimeter, about the width of the annular transition region between the cornea and the orbit, so that the spiral reflection points lie mostly within the cornea. The center of the Beam 3 spiral search is to the side of the Beam 2 away from the Beam 1, to maximize chances of falling on the cornea.

If Beam 3 shows a larger curvature indicative of the orbit, then it is rejected as being too close to the transition annulus where the cornea and orbit join, and the process is repeated for the Beam 3 with a spiral farther from Beam 1 until a small curvature is measured indicative of a cornea.

Otherwise, if the Beam 2 curvature estimate indicates another point on the orbit, then Beam 2 again begins tracking, but Beam 3 begins by searching for a cornea as above by means of smaller estimated radius. This process continues, possibly for several more beams until a corneal reflection point is acquired.

If, instead of an orbit, Beam 1 acquires a corneal point, then Beam 2 searches in a spiral beginning at about the diameter of the orbit centered at Beam 1 and decreasing to not less than the diameter of the cornea. This way it is sure to acquire an orbital point.

A third point is then acquired by Beam 3 on the cornea or the orbit (doesn't matter which because we desire two points on either) and a fourth by Beam 4 on the orbit if Beam 3 was on the cornea or on the cornea if Beam 3 was on the orbit.

Further points may be acquired by attempting to first acquire points of the least number on either the cornea or the orbit, so that in the end there is a balance of nearly the same number of tracking points on the orbit as on the cornea.

Preferred Steady-State Beam Tracking Algorithm

Repeat the following steps so long as measurements are to be obtained:
 Select the one or more of the receivers which have the maximum signal levels from at least five sources, say, receiver M.
 Obtain an estimate for best next beam angles by Kalman prediction method, giving best estimate in a minimum mean-squares sense.
 Move the beams in fixed relative positions to each other to the estimated best next angles of the preceding step.
 Adjust beam positions until all signals are respectively optimized with the same photodetectors.
 If any beam track is lost, perform the above acquisition procedure fur that beam, as for Beam 1 above.
 If no reacquisition is obtained in a specified time limit (e.g. one second) indicate by warning message.
 If beam tracking is reacquired at near the same location within some set interval, indicate that a blink or other obstruction occurred.
 If at least two beams fall on the orbit and at least two on the cornea, the LOS computation proceeds with at least four normals as derived above.
 If only three beams are tracking, at least on the orbit and one on the cornea, LOS computation uses the formula given three normals, above.
 If only two beams are tracking, one on the orbit and one on the cornea, the two-normal approximation formula above is used.
 If less than one beam is tracking on either the cornea or the orbit, an initial beam acquisition is performed as above, and if this does not succeed in some length of time (e.g. the maximum response delay that the user desires), then an error is indicated to this effect.

Although six signals is a minimum as indicated earlier, more will improve the accuracy of the measurements. A feasible tracker can use up to about 20 sources in 0.1-second cycles on low-cost digital signal processor (DSP) boards for PC-class computers.

Ambiguity in line of sight estimation can occur due to multiple reflection when the eye is pointed far to one side, when light can reflect from the orbit to the cornea and this can be confused with a reflection directly from the orbit or cornea. Multiple reflections can be avoided by limiting the viewer's position and view angles so that the same beam cannot glance off both cornea and orbit.

SUMMARY

A method has been described for remotely estimating line-of-sight suitable for a wide range of applications, including hands-free manipulation of control panels, indication of defect locations during visual inspection of large surfaces, and as a convenient and comfortable computer-human interface. Estimates of eye position and orientation are obtained without encumbering a person in any way. Advantages over previous methods and implementations are:
 No moving parts, rugged and reliable, long-term operation.
 Remote operation up to several meters from the eye.
 Angular field of regard of from about 60 to 90 degrees.
 Freedom from calibration to individuals and periodic recalibration.
 No inhibition of head movements or speed at all within a specified volume.
 Weighing only a few ounces.
 Costing only a few hundred dollars.

Making optimal use of low-cost DSP boards recently available.

Ease of installation in digital systems as a single processor card the size of a typical personal computer insertion, and attachment of a small light source about the size of a CCD array near the area or volume being viewed, together with thin strips of photodetectors which can be attached as readily as a strip of adhesive tape.

I claim:

1. A process for generating physical signals representing the position and orientation of eyes comprising the steps of:

(a) generating and directing light beams at surfaces of said eyes using a beam formation and directing means in combination with a plurality of photodetection means, such that each of said beams is reflected from said eye surface to a particular photodetection means within said plurality of photodetection means;

(b) directing each said beam so as to maximize the illumination of said particular photodetection means by reflection of said beam from an eye surface, a control signal for said directing of said beam being derived from an output signal from said photodetection means;

(d) estimating directions of at least six said beams from said output signals, (e) for at least six of said estimated beam directions, approximating a plane perpendicular to the eye surface at the reflection point of said beam as a plane through a central point of said beam formation means, parallel to said estimated direction, and parallel to a direction from said central point of beam formation to said particular photodetection means where said reflected illumination is maximized, at least three said planes being approximately perpendicular to said orbit surface of at least one eye and at least three said planes being approximately perpendicular to said corneal surface of said eye, and (f) approximating the optical axis of at least one said eye by a line which has minimized distances from said line to intersection points of triples of said planes perpendicular to said orbit surface of at least one eye and minimized distances from said line to intersection points of triples of said planes perpendicular to the corneal surface of said eye.

2. The process for generating physical signals representing the position and orientation of eyes according to claim 1 wherein:

(a) when an estimate of accuracy of said approximation of said optical axis decreases below a specified acceptable accuracy, a new beam is formed, (b) said newly generated beam is controlled so as to locate a new reflection point on said eye surface such that the detection signal of the reflected light from said reflection point is maximized at said photodetection means, and (c) said maximization of said detection signal continues after said location of said new reflection point.

3. The process for generating physical signals representing the position and orientation of eyes according to claim 1 further characterized by said light beams being at an infrared frequency.

4. The process for generating physical signals representing the position and orientation of eyes according to claim 1 wherein:

(a) line of sight of said eyes is estimated from at least one estimate of said optical axis, (b) said estimated line of sight is output in the form of said physical signals, and (c) said physical signals are used to control an external process.

5. The process for generating physical signals representing the position and orientation of eyes according to claim 4 wherein said controlled external process is a computer.

6. The process for generating physical signals representing the position and orientation of eyes according to claim 4 wherein said controlled external process is a television set.

7. The process for generating physical signals representing the position and orientation of eyes according to claim 4 wherein said controlled external process is an industrial process.

8. A process for generating physical signals representing the position and orientation of eyes comprising the steps of:

(a) generating and forming spatially shaped or structured light beams and detecting reflections of said light beams using means including beam generation and shaping means, light source means, beam directing means, a plurality of photodetection means, and means to generate output signals from each said photodetection means, (b) deriving a control signal for directing of each said beam from an output signal from said specific photodetection means;

(c) using said control signal to direct each said beam at said eye surface such that said beam is reflected from said surface to a specific photodetection means among said plurality of photodetection means so as to maximize the reflected light intensity at said specific photodetection means, (d) directing at least six said beams maximizing said output signals so that at least three said beams are reflecting from said orbit of at least one of said eyes and at least three said beams are reflecting from a cornea of said eye, (e) for each of said six beams, approximating a plane perpendicular to the eye surface at the reflection point of said beam by a plane passing through said beam formation means, parallel to an estimated direction of said beam, and parallel to a line through said beam formation means and said specific photodetection means where intensity of said reflected beam is maximized, (f) approximating the optical axis of at least one said eye by a line which passes through a specified neighborhood of intersection points of triples of said planes approximating planes perpendicular to said orbit surface of at least one eye and minimized distances from said line to intersection points of triples of said planes approximating planes perpendicular to the corneal surface of said eye.

9. The process for generating physical signals representing the position and orientation of eyes according to claim 8 wherein:

(a) new beams are generated by said beam generation and formation means up to some specified number greater than or equal to six, (b) direction of each said new beam is controlled to reflect from said eye surface such that the detection signal of the reflected light from said reflection point is maximized at a photodetection means within said plurality of photodetection means, and (c) when it becomes no longer possible to control one of said number of beams so as to maximize said detection signal, generation of said beam is discontinued, and at least one said new beam is generated to replace said discontinued beam.

10. The process for generating physical signals representing the position and orientation of eyes according to claim 8 further characterized by said light beams being at an infrared frequency.

11. A process for generating physical signals representing the position and orientation of eyes comprising the steps of:

(a) generating light beams by light source means in combination with beam formation means and beam directing means (b) directing light beams at surfaces of said eyes using said beam directing means, such that each of said beams is reflected from an eye surface to a particular photodetection means among a plurality of photodetection means, (c) controlling the direction of said beam so as to maximize the illumination of said particular photodetection means resulting from reflection of said beam from an eye surface, a control signal for control of said beam being derived from an output signal from said particular photodetection means;

(d) measuring direction of said beam outgoing from beam formation means of a specified minimum number of said beams, (e) measuring arrival angle at said particular photodetection means of said beam after reflection from said eye surface, (f) for each of said controlled beams with maximized illumination at a particular photodetection means, estimating parameters determining a line perpendicular to the eye surface at the reflection point of said beam as the angular bisector of said beam's outgoing direction and reflected direction, at least one said line being approximately perpendicular to said corneal surface of at least one of said eyes visible between the eyelids and at one said line being approximately perpendicular to the orbit surface surrounding said cornea and visible between the eyelids, and (f) approximating the optical axis of at least one said eye by a line which has minimized distances from said line to said lines perpendicular to said orbit surface and from said line to said lines perpendicular to said corneal surface.

12. The process for generating physical signals representing the position and orientation of eyes according to claim 11 wherein:

(a) line of sight of said eyes is estimated from at least one estimate of said optical axis by adding a fixed angular offset from said optical axis, (b) said estimated line of sight is output in the form of said physical signals, and (c) said physical signals are used to control a system.

13. A process for generating physical signals representing the position and orientation of eyes according to claim 12 further characterized wherein said system is a home entertainment system.

14. A process for generating physical signals representing the position and orientation of eyes according to claim 12 further characterized wherein said system includes a computer.

15. A process for generating physical signals representing the position and orientation of eyes according to claim 12 further characterized wherein said system includes an industrial process.

* * * * *